US005652616A

United States Patent [19]
Chen et al.

[11] Patent Number: 5,652,616
[45] Date of Patent: Jul. 29, 1997

[54] OPTIMAL DISPARITY ESTIMATION FOR STEREOSCOPIC VIDEO CODING

[75] Inventors: Xuemin Chen; Vincent Liu, both of San Diego, Calif.

[73] Assignee: General Instrument Corporation of Delaware, Chicago, Ill.

[21] Appl. No.: 692,630

[22] Filed: Aug. 6, 1996

[51] Int. Cl.$^6$ .......................... H04N 13/00; H04N 13/02; H04N 15/00
[52] U.S. Cl. .................................. 348/43; 348/42
[58] Field of Search .................. 348/42, 43, 46, 348/47

[56] References Cited

PUBLICATIONS

R. Franich et al., "Balance Compensation for Stereoscopic Image Sequence Sequences," Document ISO/IEC JTC1/SC29/WG11 MPEG 96, Mar. 1996, Firenze, Italy, pp. 1–2.
A. Puri et al., "Gain Corrected Stereoscopic Coding Using SBASIC for MPEG-4 Multiple Concurrent Streams," Document ISO/IEC JTC1/SC29/WG11 MPEG 95/0487, Nov. 1995, Dallas, Texas, USA, pp. 1–5.

*Primary Examiner*—Howard W. Britton
*Assistant Examiner*—Frank Snow
*Attorney, Agent, or Firm*—Barry R. Lipsitz; Ralph F. Hoppin

[57] ABSTRACT

Disparity estimation between the right and left view pixel luminance values in a stereoscopic video signal is optimized by determining the minimum least-square-error between macroblocks of the right and left view pictures. Affine transform coefficients and disparity vectors which correspond to the minimum error are also determined and transmitted in the data stream for use by a decoder in reconstructing the right view picture. The scheme can be implemented either locally, at the macroblock level, or globally, at the picture level. At the macroblock level, least-square-error optimization may occur for each individual macroblock in the right view picture. In this case, affine transform coefficients are provided for each macroblock. At the picture level, the sum of the least-square-errors is minimized after the blocks of the right view picture are matched to the left view picture. In this case, only one set of affine transform coefficients are required for the entire right view picture. Or, block matching between an affinely transformed left view picture and the right view picture may be performed after minimizing the sum of the least-square-errors. The scheme is particularly useful in minimizing the effects of cross-channel luminance imbalances due to camera variations and scenes with significant changes in brightness or contrast, and is compatible with stereoscopic video systems such as the MPEG Multi-view Profile (MVP) system.

18 Claims, 5 Drawing Sheets

OPTIMAL DISPARITY ESTIMATION FOR STEREOSCOPIC VIDEO CODING

BACKGROUND OF THE INVENTION

The present invention relates to coding of stereoscopic digital video signals to improve image quality. In particular, a method and apparatus for optimizing the disparity estimation between the right and left view pixel luminance values is presented.

Recently, stereoscopic video transmission formats have been proposed, such as the Motion Picture Experts Group (MPEG) MPEG-2 Multi-view Profile (MVP) system, described in document ISO/IEC JTC1/SC29/WG11 N1088, entitled "Proposed Draft Amendment No. 3 to 13818-2 (Multi-view Profile)," November 1995, incorporated hereinby reference. Stereoscopic video provides slightly offset views of the same image to produce a combined image with greater depth of field, thereby creating a three-dimensional (3-D) effect. In such a system, dual cameras may be positioned about two inches apart to record an event on two separate video signals. The spacing of the cameras approximates the distance between left and right human eyes. Moreover, with some stereoscopic video camcorders, the two lenses are built into one camcorder head and therefore move in synchronism, for example, when panning across an image. The two video signals can be transmitted and recombined at a receiver to produce an image with a depth of field that corresponds to normal human vision.

The MPEG MVP system includes two video layers which are transmitted in a multiplexed signal. First, a base layer represents a left view of a three dimensional object. Second, an enhancement (e.g., auxiliary) layer represents a right view of the object. Since the right and left views are of the same object and are offset only slightly relative to each other, there will usually be a large degree of correlation between the video images of the base and enhancement layers. This correlation can be used to compress the enhancement layer data relative to the base layer, thereby reducing the amount of data that needs to be transmitted in the enhancement layer to maintain a given image quality.

The MPEG MVP system includes three types of video pictures; specifically, the intra-coded picture (I-picture), predictive-coded picture (P-picture), and bi-directionally predictive-coded picture (B-picture). An I-picture completely describes a single video picture without reference to any other picture. In the base layer, P pictures are predicted based on previous I or P pictures. B-pictures are predicted from the closest earlier I or P picture and the closest later I or P picture. The base layer can be coded according to the MPEG-2 standard, details of which can be found in document ISO/IEC JTC1/SC29/WG11 N0702, entitled "Information Technology—Generic Coding of Moving Pictures and Associated Audio, Recommendation H.262," Mar. 25, 1994, incorporated herein by reference.

In the enhancement layer, a P-picture can be predicted from the most recently decoded picture in the enhancement layer, regardless of picture type, or from the most recent base layer picture, regardless of type, in display order. Moreover, with a B-picture in the enhancement layer, the forward reference picture is the most recently decoded picture in the enhancement layer, and the backward reference picture is the most recent picture in the base layer, in display order. Pictures in the enhancement layer can be predicted from pictures in the base layer in a cross-layer prediction process known as disparity prediction. Prediction from one frame to another within a layer is known as temporal prediction.

However, with disparity prediction of enhancement layer frames, an error is often introduced due to an imbalance between the luminance values of pixels in the base and enhancement layers. This imbalance can be caused by variations in performance between the base and enhancement layer cameras, and makes the process of disparity estimation and prediction more difficult. Furthermore, the imbalance may be caused by scene dissolves or significant changes in brightness and/or contrast in a scene such as strong flashed lights. As a result of this cross-channel luminance imbalance, image quality may be noticeably degraded.

Some schemes have been developed which reduce the effects of the cross-channel luminance imbalance. For example, R. Franich et al., in the document ISO/IEC JTC1/SC29/WG11 MPEG 96, entitled "Balance Compensation for Stereoscopic Image Sequence Sequences," March 1996, Firenze, discusses a linear transformation for adjusting the right view image sequence to get the same luminance mean and variance as the left view channel. A. Puri et al., in the document ISO/IEC JTC1/SC29/WG11 MPEG 95/0487, entitled "Gain Corrected Stereoscopic Coding Using SBASIC for MPEG-4 Multiple Concurrent Streams," November 1995, Dallas, discusses correcting the right view with a gain and offset value. However, such schemes do not minimize the least-square-error of the luminance imbalance.

Accordingly, it would be advantageous to provide a disparity estimation scheme for a stereoscopic video system such as the MPEG MVP system which minimizes the effects of cross-channel luminance imbalances due to camera variations and scenes with significant changes in brightness or contrast. Moreover, the scheme should be implemented either globally, at the picture level, or locally, at the macroblock level. Furthermore, the scheme should be compatible with efficient prediction coding of video sequences of MPEG-2 and similar coding protocols. The present invention provides the above and other advantages.

SUMMARY OF THE INVENTION

In accordance with the present invention, a method and apparatus for optimizing the disparity estimation between the right and left view pixel luminance values in a stereoscopic video signal is presented. The luminance value of macroblocks of pixel data in the right view picture are adjusted according to affine transform coefficients a, b which minimize the least-square-error between the right and left view luminance values. In a first embodiment, optimization may occur for each macroblock in a right view search window based on a comparison with a number of macroblocks in a left view reference window. In this case, an optimum comparison macroblock in the reference window is determined, and a corresponding set of transform coefficients is determined. Additionally, a corresponding disparity vector $v=(v_x, v_y)$ is determined which indicates the location of the optimum comparison macroblock. The right view pixel data is then processed using differential encoding, a discrete cosine transformation (DCT), quantization, run-length coding, and Huffman coding. The coded DCT coefficients, affine transform coefficients, and disparity vectors are then transmitted in the stereoscopic video signal for use in reconstructing the right view picture at a decoder.

In a decoder, the DCT coefficients are inverse quantized and inverse transformed to recover the right view differential pixel data. Furthermore, the left view pixel data and the disparity vectors are used to provide a prediction signal, and the prediction signal is affinely transformed using the transform coefficients. The transformed left view prediction signal is added to the right view differential data to recover the right view pixel luminance values.

In a second embodiment, optimization occurs at the picture level, and one set of transform coefficients is determined which minimizes the sum of the least-square-errors for each of the individual right view macroblocks. This technique reduces the amount of transform coefficient data that must be carried as overhead in the stereoscopic video data stream. Moreover, computational complexity is reduced since the left view search window macroblock is first matched to a right view reference window macroblock using a block-matching procedure. Then, the sum of the minimum least-square-errors for the matched macroblocks is determined.

In a third embodiment, optimization also occurs at the picture level. Here, right view macroblocks are compared to left view macroblocks which are similarly positioned within the picture. Then, the affine transform coefficients are determined by minimizing the sum of the least-square-error for each right view macroblock. Next, block matching is performed between the right view macroblocks and affinely transformed left view macroblocks to determine the disparity vectors.

DETAILED DESCRIPTION OF THE INVENTION

Figure 1:
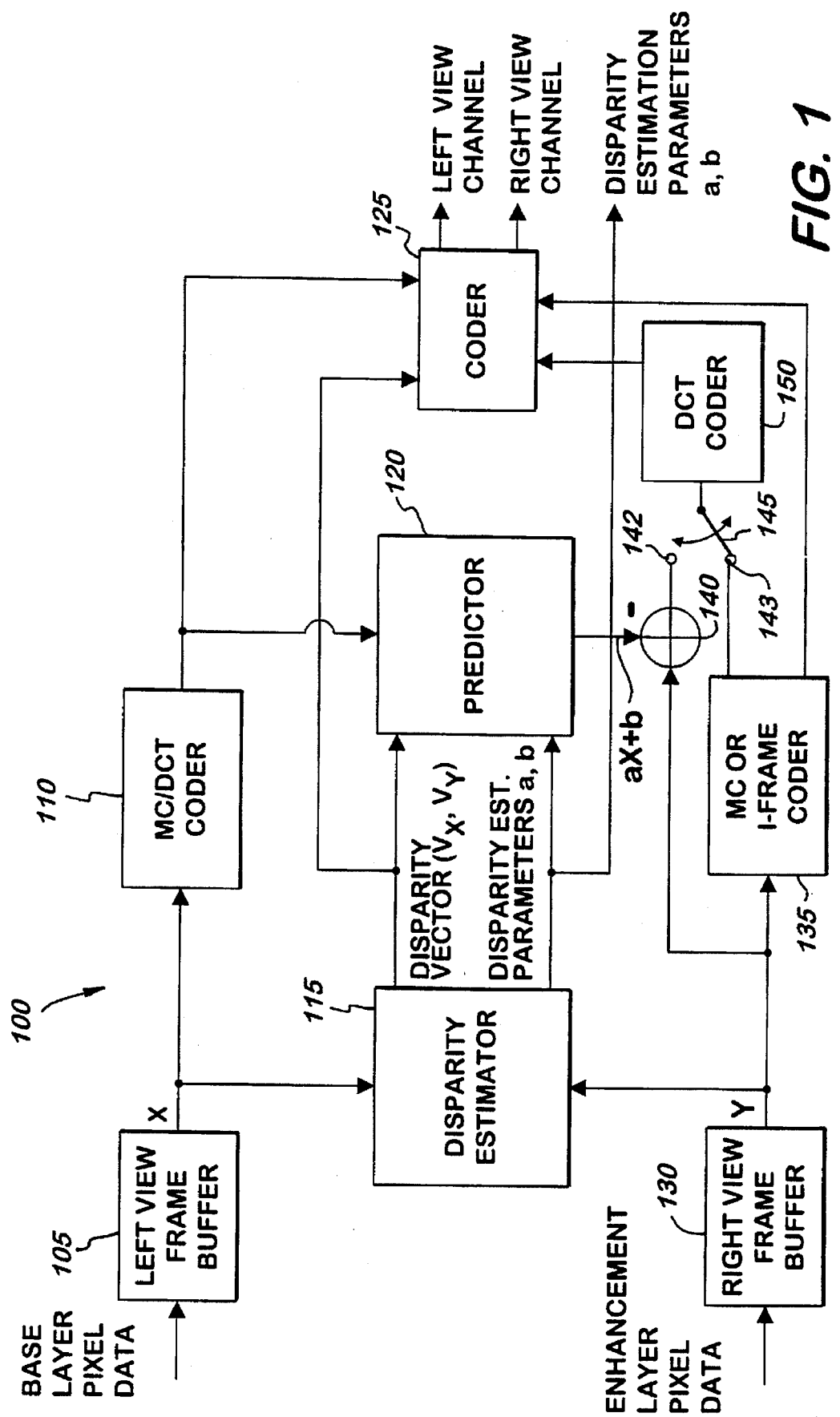
FIG. 1 is a block diagram of a stereoscopic encoder in accordance with the present invention.

A method and apparatus for optimizing the disparity estimation between the right and left view pixel luminance values in a stereoscopic video signal is presented FIG. 1 is a block diagram of a stereoscopic encoder in accordance with the present invention. Such a coding scheme can be implemented by using MPEG-2 temporal scalability syntax. The encoder is shown generally at 100. The left view sequence, carried in the base layer, is coded in accordance with the conventional MPEG-2 profile. The right view sequence, carried in the enhancement layer, has the same syntax as the MPEG-2 Temporal Enhancement layer coder.

A left view frame buffer 105 of the encoder 100 receives base layer pixel data, represented by the vector X, while a right view frame buffer 130 receives enhancement layer pixel data, represented by the vector Y. The left and right view pixel data are provided to a disparity estimator 115 for processing as will be described in greater detail below. The disparity estimator 115 provides a disparity vector $v=(v_x, v_y)$ and disparity estimation parameters a, b to a predictor 120.

In particular, the disparity estimator 115 performs an affine transform, and a, b are affine transform coefficients. In an affine transformation, a finite point is mapped to another finite point. Furthermore, the coefficient "a" indicates the contrast, and the coefficient "b" indicates the brightness of the pixel data. The transform coefficients are carried in the stereoscopic video data stream for use in reconstructing the enhancement layer picture at a decoder. The disparity vector $v=(v_x, v_y)$ is also provided to a coder 125. The disparity vector $v_x, v_y$ indicates the positional difference between corresponding macroblocks of pixels of the base layer and the enhancement layer, and is used for reconstruction of the disparity-predicted enhancement layer picture at a decoder. In particular, with the pixel coordinates for a search window macroblock in the enhancement layer being $(x_s, y_s)$, and the pixel coordinates for a corresponding reference window macroblock in the base layer being $(x_r, y_r)$, the disparity vector is $v=(v_x, v_y)=(x_s-x_r, y_s-y_r)$. Thus, the disparity vector is a measure of a positional or translational difference between the search window and the reference window. Typically, the pixel coordinate of a macroblock of pixels is taken as the coordinate of the leftmost, uppermost pixel of the block. The disparity vectors may be transmitted in the right view channel data stream for use in reconstructing the disparity-predicted enhancement layer picture at a decoder. The predictor 120 provides a signal aX+b which is subtracted from the enhancement layer pixel data Y at an adder 140 to provide differential right view pixel data. The differential right view pixel data, Y−(aX+b), is then provided to a terminal 142.

In the base layer, a motion compensation (MC) and discrete cosine transformation (DCT) coder 110 receives the left view pixel data X and performs conventional encoding. The MC/DCT coder 110 then outputs motion vectors and DCT coefficients to the coder 125. The predictor 120 also receives the MC data from the MC/DCT coder 110. A coder 135 receives the right view pixel data Y and performs motion compensation and/or I-frame coding. The coder 135 then outputs either I-frame pixels to terminal 143, or motion vectors to the coder 125. A switch 145 provides a DCT coder 150 with either the differential right view pixel data, Y−(aX+b)=Y−aX−b, at terminal 142, or the I-frame coded right view pixel data at terminal 143. When terminal 143 is selected, the disparity estimation process is bypassed. This may be desirable, for example, when it is determined that the least-square-error (LSE) is larger than a given level, or when a group of pictures arrangement requires an I-picture The DCT coder 150 processes the pixel data to provide corresponding transform coefficients to the coder 125.

At the coder 125, the left and right view motion compensation vectors, DCT coefficients, and disparity vectors are coded using differential pulse code modulation (DPCM), run-length coding, and Huffman coding to produce the left view channel and right view channel data streams. Subsequently, the left and right view channels are multiplexed together along with the disparity estimation parameters a, b in a multiplexer (not shown), and modulated for transmission with an appropriate carrier signal.

In accordance with the present invention, the disparity estimator 115 minimizes the error of the right view pixel luminance data according to a least square error criteria. Note that the use of the term "error" only means that the left view data is taken as the baseline. Thus, the error of the right view data is simply an imbalance or discrepancy in relation to the left view data. In particular, the disparity estimator 115 minimizes the error $E=(abs(Y-aX-b))^2$, where "abs" denotes the absolute value. The disparity estimator 115 uses an optimal affine transform and block matching procedure, where block matching is performed at the macroblock level. For instance, with an NTSC format, a video frame may be divided into thirty slices, each of which has forty-four macroblocks. Thus, an entire NTSC frame comprises 1,320 macroblocks. With a PAL format, there are 1,584 macroblocks. Moreover, a macroblock typically comprises a 16×16 block of pixels which in the MPEG-2 standard, for example, is comprised of four 8×8 pixel blocks.

A search window is defined as a current macroblock in the right view picture which is to be compared to different macroblocks in a reference window of a left view picture. In particular, the left view picture used for comparison is the next picture, or the most recent picture, in display order. Moreover, the searching range (e.g., the size of the reference window) is determined by the movement of the stereoscopic cameras. Typically, horizontal camera movements are greater than vertical movements, so the reference window may be designed to have a width which is greater than its height. For example, the search window may be 16×16 integer pixels while the reference window may range from 32×32 to 64×48 integer pixels. Of course, various sizes of search and reference windows may be used, and there is no requirement that the search window correspond to a particular macroblock size.

Figure 2:
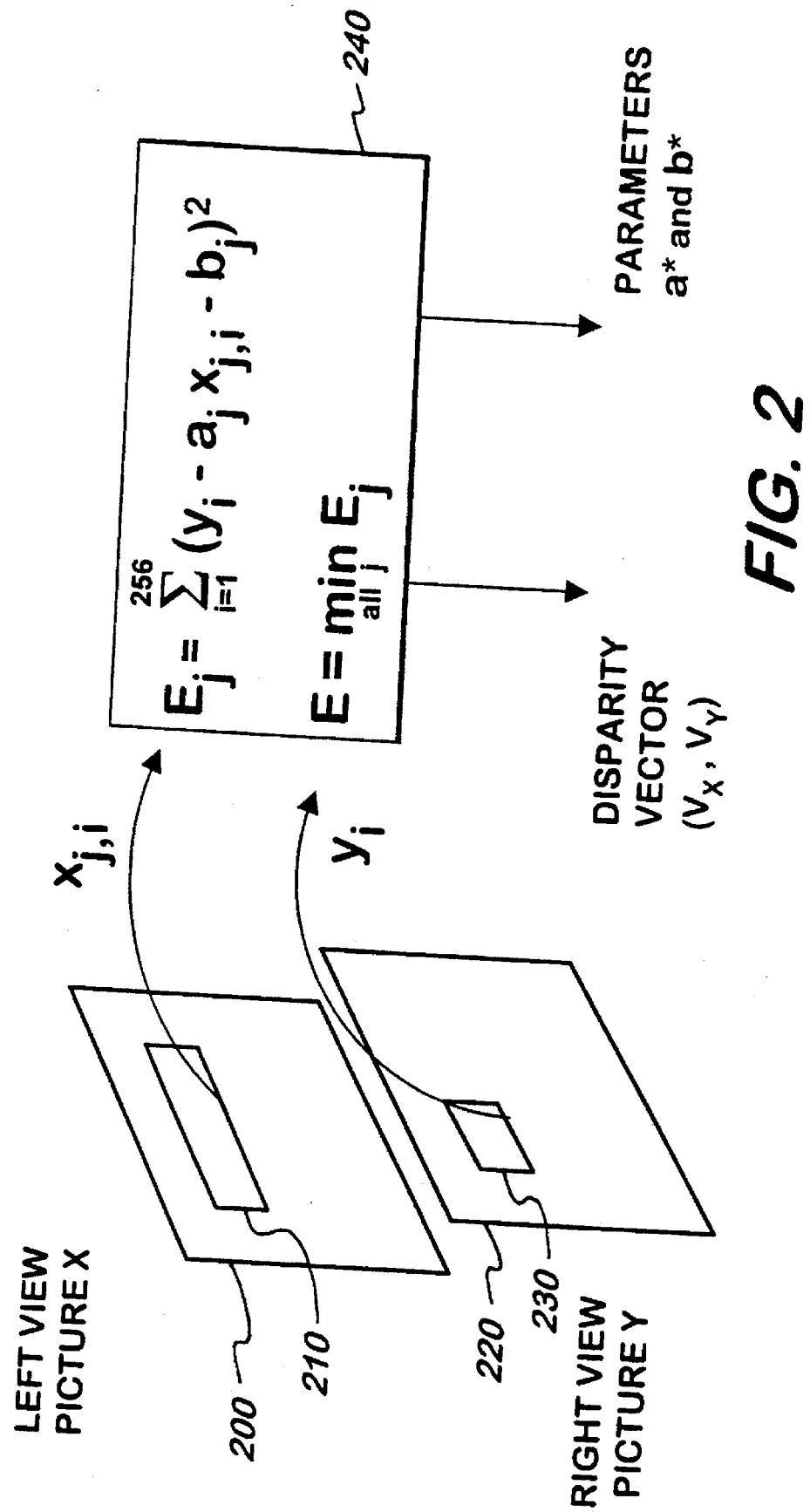
FIG. 2 shows a macroblock level optimization scheme in accordance with the present invention.

FIG. 2 shows a macroblock level optimization scheme in accordance with the present invention. In this embodiment, the least-square-error optimization process of the disparity estimator 115 is performed over individual macroblocks of the right view picture. The left view picture 200 includes a reference window 210, and the right view picture 220 includes a search window 230. While only one search window and reference window are shown, the entire right view picture 220 may be partitioned into search windows in order to minimize the cross-channel luminance imbalance over the entire right view picture. In this case, corresponding additional reference windows will be provided in the left view picture. Moreover, the reference windows may be overlapping.

Let $Y_i$, for i=1 to 256 be the respective luminance (e.g., intensity) values of 256 pixels in a 16×16 pixel search window 230, and let $x_{j,i}$ for i=1 to 256 be 256 pixel intensities of the jth 16×16 macroblock of the reference window. Thus, the subscript "j" represents a particular region of a given reference window, and the subscript "i" represents a particular pixel in a given search window. For example, with a 16×16 pixel search window and a 64×48 pixel reference window, the search window will be compared to (64−16+1)×(48−16+1)=49×33=1,617 different 16×16 regions in the reference window.

For each jth region of the given reference window, it is possible to determine the disparity estimation parameters $a_j$ and $b_j$ which minimize the quantity $$E_j = \sum_{i=1}^{256} (y_i - a_j x_{j,i} - b_j)^2.$$

This process, which is carried out at function 240, provides a contrast, a, and brightness, b, setting that makes the affinely transformed $x_{j,i}$ values have the least squared distance from the $y_i$ values. The minimum of $E_j$ occurs when the partial derivatives with respect to $a_j$ and $b_j$ are zero, i.e.

$$\frac{\partial E_j}{\partial a_j} = -2 \sum_{i=1}^{256} x_{j,i}(y_i - a_j x_{j,i} - b_j) = 0,$$

and

-continued $$\frac{\partial E_j}{\partial b_j} = -2 \sum_{i=1}^{256} (y_i - a_j x_{j,i} - b_j) = 0,$$

which occurs when $$a_j = \frac{\sum_{i=1}^{256} x_{j,i} \sum_{i=1}^{256} y_i - 256 \sum_{i=1}^{256} x_{j,i} y_i}{\left(\sum_{i=1}^{256} x_{j,i}\right)^2 - 256 \sum_{i=1}^{256} x_{j,i}^2},$$

for $\left(\sum_{i=1}^{256} x_{j,i}\right)^2 - 256 \sum_{i=1}^{256} x_{j,i}^2 \neq 0$, or $$a_j = 1, \text{ for } \left(\sum_{i=1}^{256} x_{j,i}\right)^2 - 256 \sum_{i=1}^{256} x_{j,i}^2 = 0,$$

and $$b_j = \frac{1}{256} \left( \sum_{i=1}^{256} y_i - a_j \sum_{i=1}^{256} x_{j,i} \right).$$

The above calculations can be performed using known computational techniques. The "best" affine transform coefficients a* and b* (i.e., the coefficients which minimize the error Ej over all j possible reference window blocks) and the best matching blocks $x_{*,1}, x_{*,2}, \ldots, x_{*,256}$ (e.g., $x_{*,i}$) in the reference window are determined from the condition $$E = \min_{\text{all } j} E_j.$$

Note that a>0 is required, else set a=1. Furthermore, for a 16×16=256 pixel macroblock, after the affine transformation, if pixel X'=aX+b>255, then set X'=255, and if pixel X'=aX+b<0, set X'=0. If either one of these cases occurs, the least-square-error calculation should be checked to ensure that $abs(Y-X')^2 < abs(Y-X)^2$, otherwise, if $abs(Y-X')^2 \geq abs(Y-X)^2$, set a=1 and b=0.

Once a* and b* are found for a given search window (where "*" denotes an optimal condition), the corresponding disparity vector $(v_x, v_y)$ can also be determined as discussed. The process is then repeated for each of the search windows in the enhancement layer picture. For example, with an NTSC picture format with 1,320 macroblocks per picture, $E_j$ is minimized for each of the 1,320 macroblocks. Thus, for each of the macroblocks in the enhancement layer picture, a* and b*, and $(v_x, v_y)$ are stored and transmitted in the data stream for use at the decoder in reconstructing the right view image. As seen, with the foregoing minimization process, an optimal disparity vector $(v_x, v_y)$ is obtained for each search window macroblock in the right view. Additionally, the optimal contrast and brightness setting, a* and b*, respectively, is found for each macroblock.

A drawback of this process is the relatively high implementation complexity. First, the searching algorithm is more complicated than a conventional block matching algorithm since additional calculations are performed. Second, the coefficients a* and b* must be carried as overhead in the data stream for each search window macroblock (see FIG. 1). Finally, the process may require user data in the MPEG-2 picture level syntax, or some user defined syntax.

In order to reduce the computational complexity and the data overhead for each macroblock, the search window size for determining the optimal parameters a* and b* may be increased. For example, one can determine a* and b* for each slice of a frame or field, or for variously sized macroblocks. In this manner, the total number of coefficients that must be carried in the data stream for each enhancement layer picture is reduced. Moreover, in a feedback process, a* and b* may be recomputed until a given criteria, such as a target error, is obtained.

Figure 3:
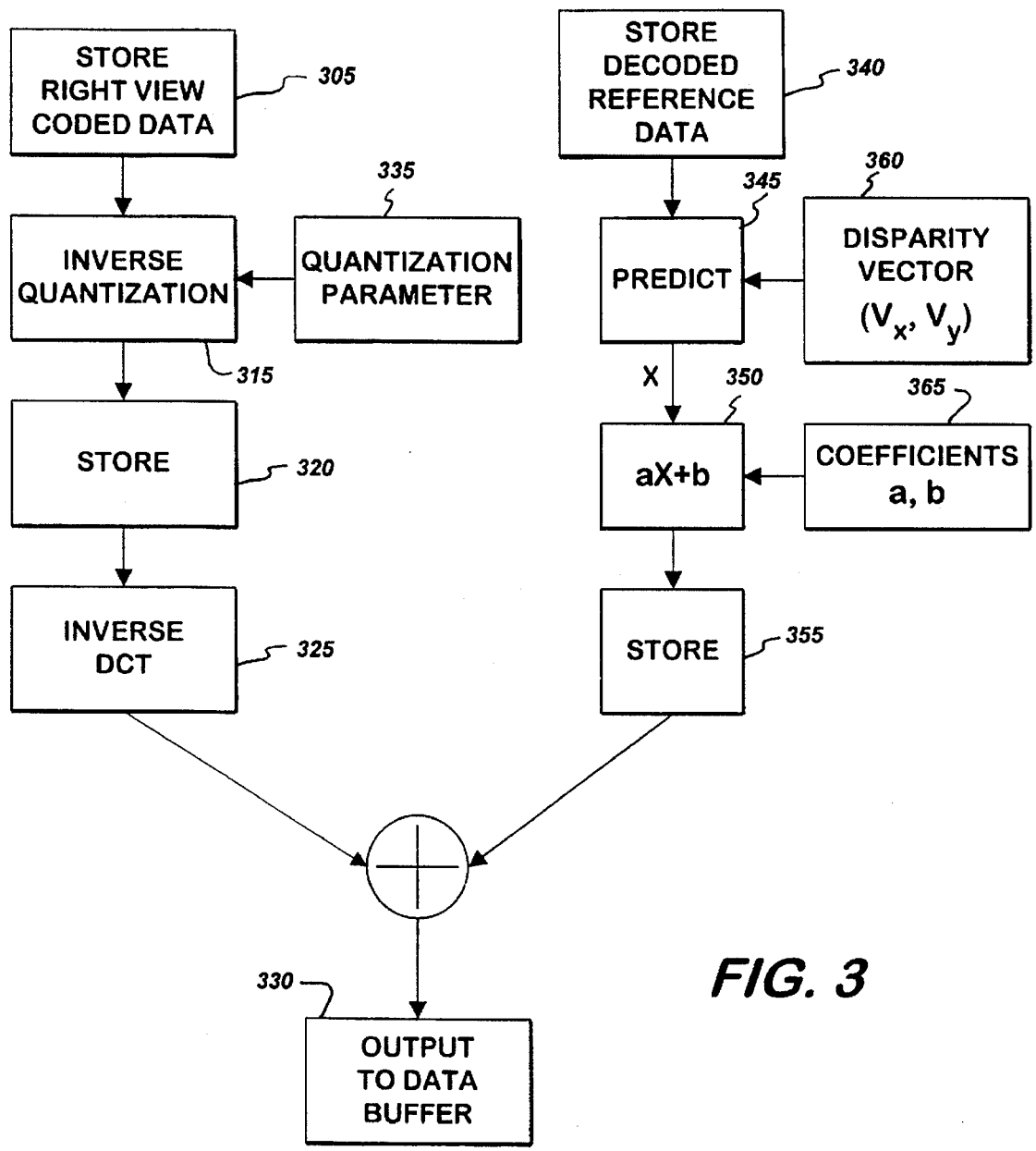
FIG. 3 illustrates a process used at a decoder in accordance with the present invention.

FIG. 3 illustrates a process used at a decoder in accordance with the present invention. At block 305, coded left view luminance pixel data received via the stereoscopic video signal is stored in memory. The coded data is inverse run-length coded and inverse Huffman coded using conventional processes, not shown. The transform coefficients and pixel data are provided to block 315 for inverse quantizing of the coded data. The inverse quantizing function 315 uses a quantization parameter provided via block 335, which may be, for example, from a look up table. At block 320, the inverse quantized differential right view pixel data is stored in memory, and at block 325, processed with an inverse DCT function to provide the uncorrected differential right view pixel data.

At block 340, decoded reference data X of the left view picture is stored in memory after retrieval from the stereoscopic video signal. At block 345, the decoded reference data X is used for prediction. Block 345 is responsive to the disparity vectors provided via block 360. The reference data X is then affinely transformed at block 350 according to the affine transform coefficients a, b received via function 365. At block 355, the predicted left view reference data is stored in memory, then summed with the uncorrected differential right view pixel data to provide the luminance-corrected right view pixel data buffer in accordance with the present invention, which is then, at block 330, output to a data buffer for subsequent processing and display.

Figure 4:
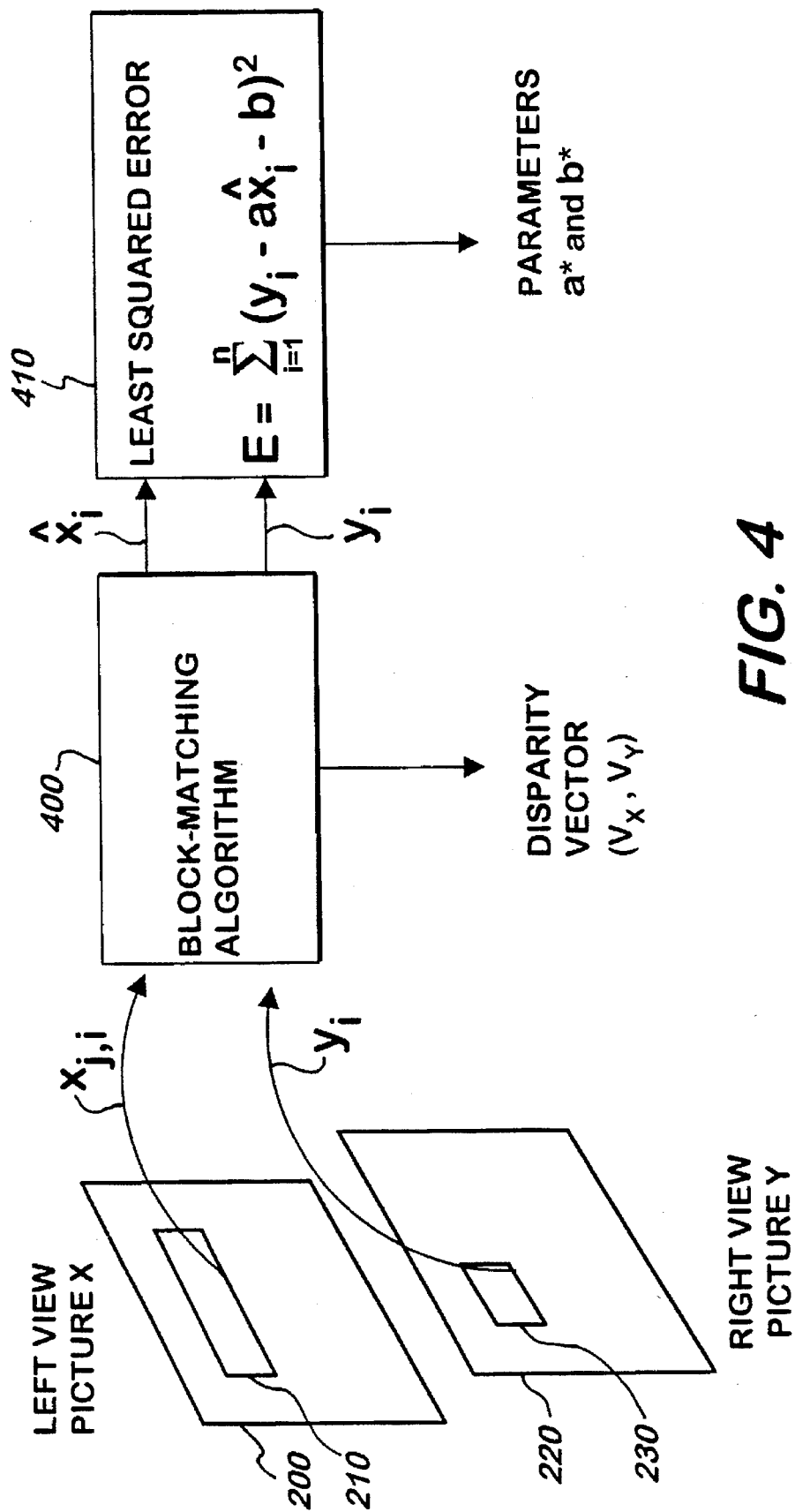
FIG. 4 shows a picture level optimization scheme in accordance with the present invention.

FIG. 4 shows a picture level optimization scheme in accordance with the present invention. In this embodiment, the foregoing least-squared-error technique is used with block matching. As before, the left view picture 200 includes a reference window 210, and the right view picture 220 includes a search window 230. Again, only one search window and reference window are shown, but it will be understood that following procedure may be applied to a plurality of search windows and reference windows in order to minimize the cross-channel luminance imbalance over the entire right view picture.

A conventional block-matching algorithm is first performed at block 400 to determine the disparity vector $(v_x, v_y)$ for each of n macroblocks in the right view picture. For example, n=1,320 with an NTSC format picture. In a conventional block-matching algorithm, a block of pixels to be matched is compared to other blocks of pixels to determine which is most similar in image content.

Then, at block 410, the sum of the least-squared-error of each search window is used to find a good overall contrast and brightness matching (e.g., coefficients a*, b*) between the left and right view pictures. Thus, for a given right view picture, the disparity vectors and compensated blocks for all search window macroblocks are determined using the conventional block matching algorithm.

Let $y_1, y_2, \ldots, y_n$ (e.g., $y_i$, for i=1 to n) be the respective values of n right view macroblocks, and let $\hat{x}_1, \hat{x}_2, \ldots, \hat{x}_n$ be the corresponding disparity compensated data from the left view picture 200. Next, the coefficients a and b which minimize the quantity $$E = \sum_{i=1}^{n} (y_i - a\hat{x}_i - b)^2$$

are determined (e.g., a* and b*). Thus, one pair of coefficients a* and b* are provided for the entire picture rather than one pair for each of the search window macroblocks.

This error minimization technique also provides a good contrast and brightness setting that minimizes the least squared error of the affinely transformed left-view picture relative to the right-view picture when $$a = \frac{\sum_{i=1}^{n} \hat{x}_i \sum_{i=1}^{n} y_i - n \sum_{i=1}^{n} \hat{x}_i y_i}{\left(\sum_{i=1}^{n} \hat{x}_i\right)^2 - n \sum_{i=1}^{n} \hat{x}_i^2},$$

for $\left(\sum_{i=1}^{n} \hat{x}_i\right)^2 - n \sum_{i=1}^{n} \hat{x}_i^2 \neq 0$, or $a = 1$, for $\left(\sum_{i=1}^{n} \hat{x}_i\right)^2 - n \sum_{i=1}^{n} \hat{x}_i^2 = 0$, and $$b_j = \frac{1}{n}\left(\sum_{i=1}^{n} y_j - a_j \sum_{i=1}^{n} \hat{x}_i\right).$$

The coding complexity and overhead with this embodiment of the invention is much less than when each individual macroblock is optimized, as discussed in connection with FIG. 2. In particular, overhead is reduced since the parameters a* and b* must be saved and transmitted only in picture level user data. However, with the present coding procedure, a buffer is required to store the coding information of a frame (or a field) before the coefficients a and b are determined since the user data, which includes a and b, will be transmitted in the data stream prior to the coded picture data itself.

Note further that the present technique can provide picture-level optimization with other block sizes, for example, such as a slice or a portion of a slice.

Decoding of the optimization scheme of FIG. 4 may be carried out using the decoding process of FIG. 3, where X is the predicted left view reference data $\hat{X}$.

Figure 5:
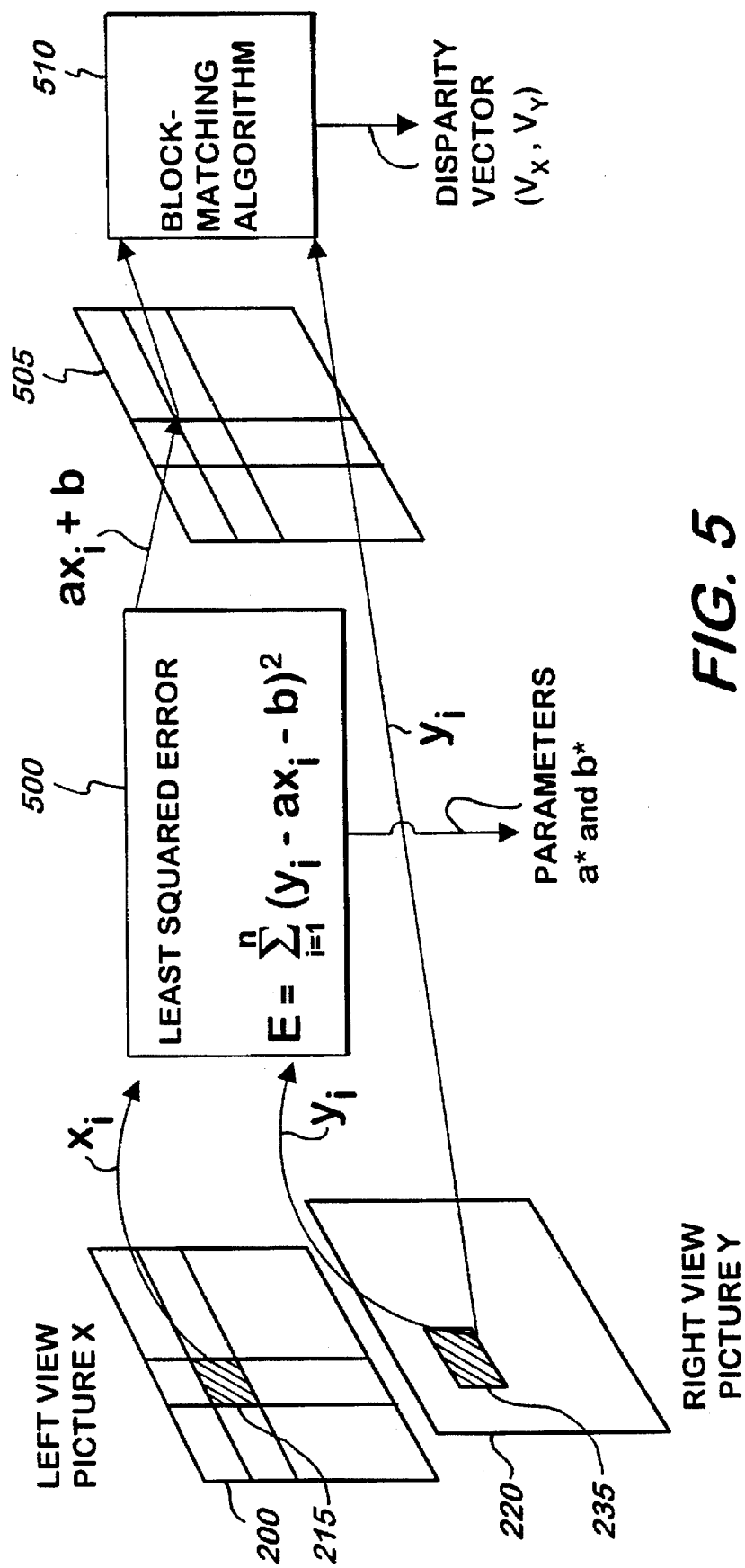
FIG. 5 shows another embodiment of a picture level optimization scheme in accordance with the present invention.

FIG. 5 shows another embodiment of a picture level optimization scheme in accordance with the present invention. The right view picture 220 includes a window 235 which corresponds to the position of a reference region 215 in the left view picture 200. The window 235 is not termed a "search" window because there is no searching process. Instead, the window 235 is a direct translation of the reference region 215 of the left view picture 200 to the right view picture 220. In this embodiment, at function 500, the LSE optimal parameters a* and b* are found directly from the left view picture X and the right-view picture Y by minimizing the sum of the least-square-errors over each window of the right view. Next, at function 510, the disparity vector $(v_x, v_y)$ for each macroblock in Y is determined by using block matching between the affinely transformed left view picture aX+b, shown at 505, and the right view picture Y. Advantageously, this embodiment of the present invention does not require a buffer for storing the picture data prior to transmission.

After obtaining the disparity vector $(v_x, v_y)$ and the optimal parameters a* and b*, disparity estimation is implemented in the same manner as motion estimation. However, the reference frames are now from the decoded left-view sequence instead of the right-view itself and the best disparity compensated blocks are obtained from an affine transform of the corresponding reference blocks.

Decoding of the optimization scheme of FIG. 5 may be carried out using the decoding process of FIG. 3.

Accordingly, it can be seen that the present invention provides a method and apparatus for optimizing the disparity estimation in a stereoscopic video encoder. In one embodiment, a least-square-error optimization occurs individually for each macroblock in the right view picture. Alternatively, optimization may be provided after the blocks of the right view picture are matched to the left view picture. Or, block matching between the affinely transformed left view picture and the right view picture may be performed after a least squared error optimization.

Other variations are possible with the present invention. For example, a portion of a picture may be optimized using one technique while another portion is optimized using another technique. Or, the selected technique may depend on criteria such a picture type, sequential arrangement of pictures in transmission or display order, picture complexity, picture quality, bandwidth requirements, and quantization level.

In further variations, LSE optimization may be implemented in a closed-loop system to achieve a constant error level or target error range. For example, in a first iteration, a relatively small search window may be used. If the resulting error is less than a predetermined level, the optimization may be repeated with a larger macroblock size. In this manner, the number of estimation coefficients which must be transmitted for each picture can be reduced while still maintaining an acceptable cross-channel luminance imbalance.

Although the invention has been described in connection with various specific embodiments, those skilled in the art will appreciate that numerous adaptations and modifications may be made thereto without departing from the spirit and scope of the invention as set forth in the claims.

We claim:

1. A method for reducing cross-channel luminance imbalance in an enhancement layer picture of a stereoscopic video signal, comprising the steps of:

providing a search window which comprises at least a portion of the pixels in said enhancement layer picture;

providing a reference window which comprises at least a portion of the pixels in a reference picture of a base layer of said stereoscopic video signal; and determining affine transform coefficients a, b of said reference window which minimize the least-square-error between luminance values of pixels of said search window and said reference window.

2. The method of claim 1, comprising the further step of:

affinely transforming said reference window pixel data using said affine transform coefficients a, b;

differentially encoding said search window pixel data using said transformed reference window pixel data; and transmitting said differentially encoded search window pixel data in conjunction with said stereoscopic video signal for use in reconstructing said enhancement layer picture.

3. The method of claim 1, comprising the further step of:

adjusting a size of at least one of said search window and said reference window and repeating said minimizing step until said least-square-error is within a target error range.

4. The method of claim 1, comprising the further step of:

transmitting said affine transform coefficients a, b in said stereoscopic video signal for use in reconstructing said enhancement layer picture.

5. The method of claim 1, comprising the further steps of:

providing additional search windows which comprise respective portions of the pixels in said enhancement layer picture;

providing additional corresponding reference windows which comprise respective portions of the pixels in said reference picture; and for each of said additional search windows, determining a set of affine transform coefficients a, b which minimize the least-square-error between luminance values of pixels of said search window and the corresponding reference.

6. A method for reducing cross-channel luminance imbalance in an enhancement layer picture of a stereoscopic video signal, comprising the steps of:

providing a plurality of windows which comprise respective portions of the pixels in said enhancement layer picture;

providing a corresponding plurality of reference windows which comprise respective portions of the pixels in a reference picture of a base layer of said stereoscopic video signal; and determining affine transform coefficients a, b which minimize the sum of the least-square-errors between luminance values of pixels of said enhancement layer picture windows and said corresponding reference windows.

7. The method of claim 6, wherein said plurality of enhancement layer picture windows are search windows, comprising the further step of:

prior to said determining step, matching said plurality of search windows to respective regions of said corresponding plurality of reference windows.

8. The method of claim 6, comprising the further steps of:

transforming said corresponding plurality of reference windows according to said affine transform coefficients a, b to provide a plurality of transformed reference windows;

matching said plurality of enhancement layer picture windows to regions of respective ones of said transformed plurality of reference windows to provide a matched plurality of enhancement layer picture windows; and for each of said matched plurality of enhancement layer picture windows, determining a disparity vector which is indicative of a translational difference between the matched of enhancement layer picture window and the corresponding transformed reference window.

9. The method of claim 8, comprising the further step of:

transmitting the disparity vectors in said stereoscopic video signal for use in reconstructing said enhancement layer picture.

10. A method for decoding a stereoscopic video signal with a reduced cross-channel luminance imbalance in an enhancement layer picture thereof, comprising the steps of:

retrieving affine transform coefficients a, b from said stereoscopic video signal;

said affine transform coefficients being determined by minimizing the least-square-error between luminance values of pixels of a search window and a reference window, wherein said search window comprises at least a portion of the pixels in said enhancement layer picture, and said reference window comprises at least a portion of the pixels in a reference picture of a base layer of said stereoscopic video signal; and using said affine transform coefficients to recover said search window pixel data.

11. The method of claim 10, wherein said search window pixel data is carried in said stereoscopic video signal as differentially encoded data, comprising the further steps of:

retrieving said reference window pixel data from said stereoscopic video signal;

using said reference window pixel data to provide reference window pixel prediction data;

affinely transforming said reference window pixel prediction data in accordance with said affine transform coefficients; and summing said affinely transformed reference window pixel prediction data with said differentially encoded data to recover said search window pixel data.

12. An encoder for reducing cross-channel luminance imbalance in an enhancement layer picture of a stereoscopic video signal, comprising:

means for providing a search window which comprises at least a portion of the pixels in said enhancement layer picture;

means for providing a reference window which comprises at least a portion of the pixels in a reference picture of a base layer of said stereoscopic video signal; and a disparity estimator for determining affine transform coefficients a, b of said reference window which minimize the least-square-error between luminance values of pixels of said search window and said reference window.

13. The apparatus of claim 12, further comprising:

a predictor operatively associated with said disparity estimator for use in affinely transforming said reference window pixel data using said affine transform coefficients a, b;

an adder for use in differentially encoding said search window pixel data using said transformed reference window pixel data; and a transmitter for transmitting said differentially encoded search window pixel data in conjunction with said stereoscopic video signal for use in reconstructing said enhancement layer picture.

14. The apparatus of claim 13, further comprising:

a motion compensator for processing said search window pixel data to provide motion compensated search window pixel data; and a switch for selecting one of said motion compensated data and said differentially encoded data for use in reconstructing said search window pixel data at a decoder.

15. An encoder for reducing cross-channel luminance imbalance in an enhancement layer picture of a stereoscopic video signal, comprising:

means for providing a plurality of windows which comprise respective portions of the pixels in said enhancement layer picture;

means for providing a corresponding plurality of reference windows which comprise respective portions of the pixels in a reference picture of a base layer of said stereoscopic video signal; and a disparity estimator for determining affine transform coefficients a, b which minimize the sum of the least-square-errors between luminance values of pixels of said enhancement layer picture windows and said corresponding reference windows.

16. A decoder apparatus for decoding a stereoscopic video signal with a reduced cross-channel luminance imbalance in an enhancement layer picture thereof, comprising:

means for retrieving affine transform coefficients a, b from said stereoscopic video signal;

said affine transform coefficients being determined by minimizing the least-square-error between luminance values of pixels of a search window and a reference window, wherein said search window comprises at least a portion of the pixels in said enhancement layer picture, and said reference window comprises at least a portion of the pixels in a reference picture of a base layer of said stereoscopic video signal; and processing means for using said affine transform coefficients to recover said search window pixel data.

17. The apparatus of claim 16, wherein said search window comprises a macroblock of said enhancement layer picture.

18. The apparatus of claim 17, wherein said search window pixel data is carried in said stereoscopic video signal as differentially encoded data, further comprising:

means for retrieving said reference window pixel data from said stereoscopic video signal;

prediction means for using said reference window pixel data to provide reference window pixel prediction data;

transform means for affinely transforming said reference window pixel prediction data in accordance with said affine transform coefficients; and an adder for summing said affinely transformed reference window pixel prediction data with said differentially encoded data to recover said search window pixel data.

* * * * *